C. BAILEY & G. K. BAGBY.
Cotton-Choppers.
No. 138,363. Patented April 29, 1873.
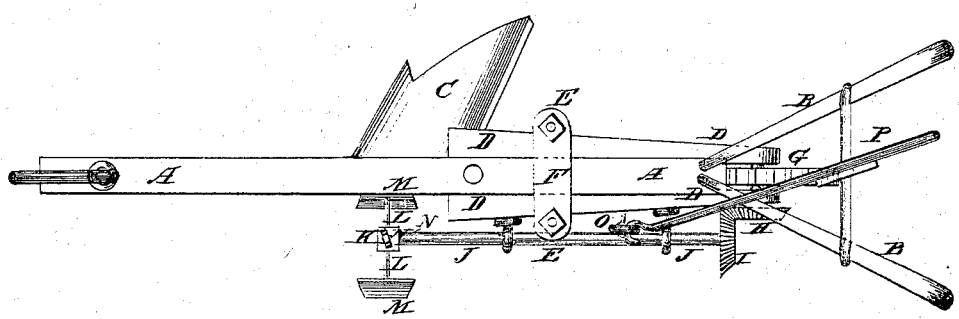
Fig. 1.
Fig. 2.
Fig. 3.
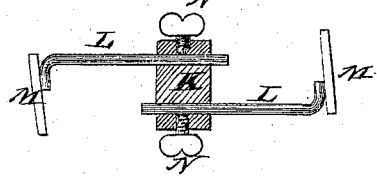
Witnesses:
P. C. Dittenel
C. Sedgwick
Inventor:
C. Bailey
G. K. Bagby
PER
Attorneys.

UNITED STATES PATENT OFFICE.

CLEMON BAILEY AND GEORGE K. BAGBY, OF KINSTON, NORTH CAROLINA.

IMPROVEMENT IN COTTON-CHOPPERS.

Specification forming part of Letters Patent No. 138,363, dated April 29, 1873; application filed March 8, 1873.

*To all whom it may concern:*

Be it known that we, CLEMON BAILEY and GEORGE K. BAGBY, of Kinston, in the county of Lenoir and State of North Carolina, have invented a new and useful Improvement in Cotton-Chopper, of which the following is a specification:

Figure 1 is a top view of my improved cotton-chopper, shown as applied to a plow. Fig. 2 is a side view of the same. Fig. 3 is a detail cross-section of the chopper-head.

Similar letters of reference indicate corresponding parts.

The invention consists in improved means for enabling cotton-choppers to be applied to turn-plows, as hereinafter fully described and pointed out in the claim.

A represents the beam, B the handles, and C the plow, of an ordinary scraper or plow for barring off cotton. D are two bars or beams placed at the lower side of the plow-beam A, upon the opposite sides of the shank of the plow C. The bars D are secured in place by a bow, E, which passes around the said bars D and the plow-beam A, and which is held in place by a yoke, F, crossing the upper side of the said beam and held down by nuts screwed upon the ends of the bow E. The rear ends of the bars D project in the rear of the plow-beam A, and to and between said projecting ends is pivoted the driving-wheel G, which is made of such a size as to roll along the surface of the ground, and its face is corrugated to prevent it from slipping upon the ground. To the projecting end of one of the journals of the wheel G is attached a bevel-gear wheel, H, into the teeth of which mesh the teeth of the bevel-gear wheel I, attached to the rear end of the shaft J. The shaft J revolves in bearings attached to the bars D, and to its forward end is attached, or upon it is formed, a head, K, through the end parts of which are formed holes to receive the arms L, which have hoes or choppers M attached to their ends. The arms L are adjustably secured in the head K by set-screws N, so that the hoes may be adjusted as required. By changing the gearing H I the chopper may be adjusted to chop the cotton to any desired stand. O is a rod, the lower end of which has an eye formed in it to receive the shaft J, and which is kept in place by collars formed upon or attached to said shaft. The rod O passes through a staple or other keeper attached to the bar D, and to its other end is pivoted the end of a rod, P, in which is formed notches, or to which is attached a notched plate, to catch upon the round of the handles B, so that by operating the rod P the shaft J may be moved longitudinally to throw the chopper into and out of gear, as may be desired.

Having thus described our invention, we claim as new and desire to secure by Letters Patent—

The means of holding the wheels G H I and shafts to the beam A, consisting of the bars D D, each fastened on one side of said beam and projecting in the rear thereof, as described.

CLEMON BAILEY.
GEORGE K. BAGBY.

Witnesses:
A. T. KENNEDY,
WM. W. N. HUNTER.